> Patented Nov. 29, 1949

UNITED STATES PATENT OFFICE 2,489,521

DRILLING MUD USING HALLOYSITE

Henry Arthur Carlson, Bartlesville, Okla., assignor to Phillips Petroleum Company, a corporation of Delaware No Drawing. Application August 18, 1947,
Serial No. 769,314

12 Claims. (Cl. 252—8.5)

This invention relates to water base drilling muds. In one embodiment it relates to water base fluids containing halloysite. In one specific embodiment it relates to drilling fluids containing halloysite and a water soluble cellulose derivative.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations in the well. In order to perform these important fuctions properly the drilling mud must have suitable viscosity and other qualities at all times in spite of adverse conditions encountered in drilling the well.

Water base drilling muds having desirable properties contain various ingredients, such as kaolin clay, bentonite clay, and additives, such as water soluble cellulose derivatives. The kaolin helps give the mud the desired viscosity that is required for carrying the drill cuttings from the well. The bentonite imparts to the mud desirable colloidal properties necessary for keeping the drilling mud suspended in a colloidal state. The cellulose derivatives are used for reducing the water loss of the drilling mud and also for maintaining the drilling mud in a colloidal state.

I have discovered that the mineral halloysite can be substituted for kaolin in water base drilling muds. Halloysite is a kaolinite-type clay mineral having a theoretical formula of

$Al_2O_3.2SiO_2.2H_2O$.

Upon preliminary studies of halloysite it would not be suspected that this material was of any value in drilling muds due to the fact that it, per se, does not remain in suspension in an aqueous medium. However, upon an extensive study I have discovered that this material can be used to a great advantage in drilling muds to replace kaolin by using it in admixture with colloidal agents such as water soluble cellulose derivatives.

One object of my invention is to provide an improved drilling mud.

Another object is to provide an improved method of drilling wells.

Another object of this invention is to provide a water base drilling fluid low in solids content.

Another object is to provide a low water loss drilling mud.

Still another object is to provide an improved drilling fluid containing halloysite.

A further object is to provide a drilling mud containing a water soluble salt of a substituted cellulose and halloysite.

Still another object is to provide an improved drilling mud containing halloysite, bentonite and a water soluble derivative of cellulose.

Still another object is to provide a water base drilling mud containing a water soluble alkali metal carboxymethylcellulose and halloysite.

Others objects and advantages of the invention will be apparent to those skilled in the art from the accompanying disclosure and discussion.

In the present invention I employ halloysite as a drilling mud component in admixture with a colloidal suspending agent, such as a water soluble salt of a substituted cellulose selected from the groups consisting of sodium, potassium, lithium and ammonium, carboxymethylcelluloses and sodium, potassium, lithium, ammonium, calcium, magnesium, barium and strontium cellulose sulfates, cellulose alkylsulfonates, and carboxyethylcelluloses, and sodium, potassium, lithium, ammonium, calcium, magnesium and strontium oxycelluloses, said oxycelluloses being reaction products of nitrogen dioxide and cellulose. Bentonite may also be used along with the cellulose derivative to extend the colloidal suspending action of the cellulose derivatives in combination with halloysite.

In the disclosure and discussion of the present invention the words "cellulosic colloidal agent" are intended to include all or any of the cellulosic materials listed above.

The amount of halloysite used in drilling mud may vary over a considerable range, depending upon several factors such as the kind and amount of other ingredients present in the mud, the desired properties of the mud and the like. However, I usually prefer to use between about 1 and about 15 weight per cent of halloysite based on the total percentage of the drilling mud. The amount of water soluble cellulosic colloidal agent employed is not critical as even small amounts give a correspondingly smaller effect. I have found that cellulosic colloidal agents, for example, sodium carboxymethylcellulose, in the amount of one half pound to four pounds per 42 gallon barrel, gives a satisfactory and economical mixture. However, much more or much less of the cellulosic colloidal agent may be employed, as desired, with a greater or lesser advantage realized. The halloysite is more quickly taken up by the drilling mud when used in powdered form. However, larger pieces can be used if time is not essential, as in a large mud pit. When bentonite is also used it is preferred to use from 0.05 to 0.2 part of bentonite to each part (by weight) of halloysite, but more or less may be employed with some useful effect.

The amount of each of these materials used depends on the nature of the earth formations encountered somewhat, and I prefer to give functional treating effect limits rather than numerical limits.

The exact method for introducing halloysite into drilling fluid is not critical. Any well known procedure in the art is satisfactory. For example, the halloysite may be added to the drilling fluid by mechanical means such as with a vibrating hopper, or it may be poured directly from the sacks, or other halloysite containers, into the mud as the mud flows past a certain point, or it may be mixed in batch form in the mud pit. Also there is no specific preferred manner for adding the cellulosic colloidal agent to the drilling fluid containing halloysite. Any of the methods set forth in the Wagner Patent No. 2,425,768 (1947) may be used. However, as one example, the cellulosic colloidal agent may be put in aqueous solution and that solution added to the drilling mud as desired. Preferably the colloidal agent is added in powdered form to a flowing stream of drilling mud.

I have found that a cellulosic colloidal agent will suspend and stabilize water base drilling muds containing halloysite against separation of the halloysite and water.

When so used, I have found that one ton of halloysite will prepare more barrels of 15 centipoise drilling mud than can be prepared by one ton of native clay, other ingredients being the same in each case. The yield values for a halloysite-bentonite (HB) mud and kaolin-bentonite (KB) mud are given in Table 1 for comparison.

TABLE 1

*Yield value of muds*

| Name | Halloysite | Kaolin | Bentonite | Yield |
|---|---|---|---|---|
| | Parts by weight | Parts by weight | Parts by weight | Barrels |
| HB-5 | 5 | | 1 | 70 |
| HB-10 | 10 | | 1 | 75 |
| HB-20 | 20 | | 1 | 59 |
| KB-10 | | 10 | 1 | 20 |

The yield value is defined as the number of barrels (42 gallons) of 15 centipoise mud which can be prepared from one ton of clay. The HB-10 mud with a yield value of 75 barrels of 15 centipoise mud per ton of clay is very superior to the KB-10 mud which will make only 20.5 barrels of 15 centipoise mud per ton of clay.

In contrast with kaolin, however, water slurries of halloysite can be stabilized with bentonite to form stable muds low in solids content. However, stable emulsions of kaolin clay and high solids content and low in bentonite can be made, but do not have suitable properties to be used as drilling muds. That is, the viscosities, gel strengths and the water loss are too high.

In order to demonstrate the value of halloysite as a component of drilling fluids in combination with cellulosic colloidal agents the following illustrative examples are given:

Test

The test of the properites of solutions of cellulosic colloidal agents and/or drilling muds were all made with standard drilling mud laboratory equipment. The measurements of pH were all made with a Beckman "Industrial Model M" pH meter. The viscosity measurements were all made with a Stormer viscosimeter 1931 model made by Arthur H. Thomas Company. The mixing of samples was always for 30 minutes with a Hamilton Beach No. 33 high speed stirrer. The filter cake thickness and water losses were all determined with an "A. P. I. low pressure wall building tester filter press" with a pressure of 100 pounds per square inch applied for 30 minutes. All temperatures were approximately room temperature. All barrels are 42 U. S. gallon barrels.

EXAMPLE I

*Effect of sodium carboxymethylcellulose on a halloysite mud.*—It was impossible to prepare a 5% halloysite mud which would remain in suspension. On standing for only 30 minutes the clay settled out, so that 66% of the sample by volume appeared as clear liquid. Three samples were removed from the colloid mill after grinding for 30 minutes and one sample was tested for water loss immediately. The water loss was 205 ml. in 7½ minutes at 100 pounds per square inch pressure. Two pounds per barrel of medium viscosity sodium carboxymethylcellulose was added to one sample while 4 pounds per barrel was added to the third sample. The slurries were stirred on a high speed mixer for 30 minutes and tested immediately. The physical properties are shown in Table 2.

TABLE 2

| Sodium carboxymethylcellulose, lbs. per bbl | 2 | 4 |
|---|---|---|
| Viscosity, cps | 18.5 | 65 |
| Initial gel strength, gms | 0 | 2 |
| 10 min. gel strength, gms | 1 | 3 |
| Water loss, ml., 30 min. at 100 p. s. i | 14.5 | 8.8 |
| Cake thickness, inches | 2/64 | 2/64 |

The sodium carboxymethylcellulose treated halloysite mud (both the 2 pounds per barrel and the 4 pounds per barrel) remained in suspension for the period of standing of 96 hours. No clear liquid appeared. There was no bentonite, nor other clays than halloysite in this drilling mud of Table 2. A small amount of bentonite will extend the treating value of the cellulosic colloidal material.

EXAMPLE II

*Physical properties of halloysite-bentonite mud.*—The physical properties were determined on a drilling mud containing 8% clay (7.27% halloysite +0.73% bentonite) which had been milled for 75 minutes to a viscosity of 19 centipoises. A 250 ml. sample of this mud was diluted with 50 ml. water to 6⅔% total clay, and stirred on a high speed mixer for 30 minutes and tested immediately. The physical properties are shown in Table 3.

TABLE 3

| | | |
|---|---|---|
| Viscosity | cps | 14 |
| Initial gel strength | gms | 20 |
| 10 min. gel strength | gms | 22 |
| Water loss, ml., 30 min. at 100 p. s. i. | | 71 |
| Cake thickness | inches | 8/64 |

EXAMPLE III

*Effect of sodium carboxymethylcellulose on HB-10 Weighted muds.*—A 3000 gm. batch of HB-10 mud was prepared containing 8% clay (0.73% bentonite + 7.27% halloysite) by grinding in the colloid mill for one hour at a setting of 24. The mud was allowed to age for 48 hours. The viscosity was 8.5 cps. The mud was divided into three samples. One sample was weighted to 9.85 lbs. per gal., another sample to 11 lbs. per gal., and the third sample to 12.4 lbs. per gal. with barium sulfate.

The composition of the weighted HB-10 muds are as follows in Table 4:

TABLE 4

| Weight, lbs. per gal. | Bentonite | Halloysite | BaSO₄ | Water |
| --- | --- | --- | --- | --- |
| 9.85 | 0.62 | 6.24 | 14.26 | 78.88 |
| 11.00 | 0.54 | 5.38 | 26.06 | 68.02 |
| 12.40 | 0.44 | 4.44 | 39.03 | 56.09 |

Sodium carboxymethylcellulose was added dry to the muds, the samples stirred and then allowed to stand for 24 hours. At the end of 24 hours, the samples were stirred on the high speed mixer for 30 minutes and tested immediately. The effect of sodium carboxymethylcellulose on the weighted HB-10 muds is given in the following Table 5. The HB-10 mud, 9.85 lbs. per gal., showed 3½% clear liquid upon standing 24 hours, while the 12.4 lbs. per gal. mud showed 12% clear liquid upon standing 24 hours. The sodium carboxymethylcellulose suspended all the weighted muds.

TABLE 5

| Mud Weight, lbs./gal | 9.85 | 9.85 | 11.0 | 11.0 | 11.0 | 11.0 | 12.4 | 12.4 |
| --- | --- | --- | --- | --- | --- | --- | --- | --- |
| Sodium carboxymethylcellulose, lbs./bbl | 0 | 2 | 0 | 1 | 2 | 4 | 0 | 2 |
| Viscosity, cps | 5 | 12 | 10 | 11 | 17.5 | 43 | 15 | 21.5 |
| Initial gel strength, gms | 5 | 0 | 12 | 0 | 0 | 2 | 20 | 0 |
| 10 Min. gel strength, gms | 15 | 5 | 15 | 2 | 2 | 5 | 25 | 2 |
| Water loss, ml. 30 min. at 100 lbs | 80 | 8.4 | 96.5 | 10 | 6.5 | 3.8 | 127 | 7.4 |
| Cake Thickness, inches | 19/64 | 5/64 | 19/64 | 9/64 | 5/64 | 5/64 | 29/64 | 9/64 |

EXAMPLE IV

A 2 pound per barrel aqueous solution of sodium carboxymethylcellulose was prepared and subjected to filtration at atmospheric temperature at a pressure of 100 pounds per square inch through a standard filter paper. It was observed that 300 milliliters of this solution passed through the standard filter paper under these conditions in about 35 seconds. Under the same conditions a suspension of 5% by weight of halloysite in water 205 milliliters passed through the standard filter paper in about 8 minutes. When 2 pounds per barrel of sodium carboxymethylcellulose was added to the suspension of 5% by weight of halloysite in water only 14 milliliters passed through the filter paper in 30 minutes.

EXAMPLE V

A 2 pound per barrel aqueous solution of calcium cellulose sulfate was prepared and subjected to filtration at atmospheric temperature at a pressure of 100 pounds per square inch through a standard filter paper. It was observed that 300 milliliters of this solution passed through the standard filter paper under these conditions in about 30 seconds. Under the same conditions a suspension of 5% by weight of halloysite in water 205 milliliters passed through the standard filter paper in about 8 minutes. When 2 pounds per barrel of calcium cellulose sulfate was added to the suspension of 5% by weight of halloysite in water only 15 milliliters passed through the filter paper in 30 minutes.

EXAMPLE VI

A 2 pound per barrel aqueous solution of potassium carboxyethylcellulose (potassium beta carboxyethyl cellulose ether) was subjected to filtration at atmospheric temperature at a pressure of 100 pounds per square inch through a standard filter paper. It was observed that 300 milliliters of this solution passed through the standard filter paper under these conditions in about 40 seconds. Under the same conditions a suspension of 5% by weight of halloysite in water 205 milliliters passed through the standard filter paper in about 8 minutes. When 2 pounds per barrel of potassium carboxyethylcellulose was added to the suspension of 5% by weight of halloysite in water only 16 milliliters passed through the filter paper in 30 minutes. Corresponding salts of the other form of carboxyethylcellulose (alpha carboxyethyl cellulose ether) will give similar results.

These samples are given merely as illustrative of my invention and it is not intended that this invention be limited by these examples in any way. Although I have used sodium carboxymethylcellulose in most cases to illustrate my invention, it is understood that the other colloidal agents referred to herein may be used and come within the scope of my invention.

It is to be understood that this invention should not be unnecessarily limited to the above discussion and description and that many modifications and variations may be made without departing substantially from the invention or from the scope of the claims.

I claim:

1. In a process of drilling wells comprising the steps of drilling the well and well drilling tools, and circuating through the well during said drilling a water base drilling mud, the improvement comprising incorporating in said drilling mud a sufficient amount of halloysite to form a filter cake and a water soluble salt of a substituted cellulose selected from the group consisting of sodium, potassium, lithium and ammonium carboxymethylcelluloses and sodium, potassium, lithium, ammonium, calcium, magnesium, barium and strontium cellulose sulfates, cellulose alkylsulfonates, and carboxyethylcelluloses, and sodium, potassium, lithium, ammonium, calcium, magnesium and strontium oxycelluloses, said oxycelluloses being reaction products of nitrogen dioxide and cellulose, in an amount sufficient to reduce the water loss due to filtration through said filter cake but insufficient to increase the viscosity of said drilling mud to such an extent that it cannot be circulated.

2. In a process of drilling wells comprising the steps of drilling the well with well drilling tools, and circulating through the well during said drilling a water base drilling mud, the improvement comprising incorporating in said drilling mud a sufficient amount of halloysite to form a filter cake and a water soluble sodium carboxymethylcellulose in an amount sufficient to reduce the water loss due to filtration through said filter cake but insufficient to increase the viscosity of said drilling mud to such an extent that it cannot be circulated.

3. A water base well drilling mud comprising in combination sufficient water to maintain the mud as a fluid, sufficient halloysite to form a filter cake on the wall of the well, and a water soluble salt of a substituted cellulose selected from the group consisting of sodium, potassium, lithium and ammonium carboxymethylcelluloses and sodium, potassium, lithium, ammonium, calcium, magnesium, barium and strontium cellulose sulfates, cellulose alkylsulfonates, and carboxyethylcelluloses, and sodium potassium, lithium, ammonium, calcium, magnesium and strontium oxycelluloses, said oxycelluloses being reaction products of nitrogen dioxide and cellulose, in an amount sufficient to reduce the water loss due to filtration through said filter cake without increasing the viscosity of said well drilling mud to such an extent that it cannot be circulated.

4. A water base well drilling mud comprising in combination sufficient water to maintain the mud as a fluid, sufficient halloysite to form a filter cake on the wall of the well, and a water soluble sodium carboxymethylcellulose in an amount sufficient to reduce the water loss due to filtration through said filter cake without increasing the viscosity of said well drilling mud to such an extent that it cannot be circulated.

5. In a process of drilling wells comprising the steps of drilling the well with well drilling tools, and circulating through the well during said drilling a water base drilling mud, the improvement comprising incorporating in said drilling mud a sufficient amount of halloysite to form a filter cake, from 0.05 to 0.2 part of bentonite per part of halloysite by weight to increase the yield of said drilling mud, and a water soluble salt of a substituted cellulose selected from the group consisting of sodium, potassium, lithium and ammonium carboxymethylcelluloses and sodium, potassium, lithium, ammonium, calcium, magnesium, barium and strontium cellulose sulfates, cellulose alkylsulfonates, and carboxyethylcelluloses, and sodium, potassium, lithium, ammonium, calcium, magnesium and strontium oxycelluloses, said oxycelluloses being reaction products of nitrogen dioxide and cellulose, in an amount sufficient to reduce the water loss due to filtration through said filter cake but insufficient to increase the viscosity of said drilling mud to such an extent that it cannot be circulated.

6. In a process of drilling wells comprising the steps of drilling the well with well drilling tools, and circulating through the well during said drilling a water base drilling mud, the improvement comprising incorporating in said drilling mud a sufficient amount of halloysite to form a filter cake, from 0.05 to 0.2 part of bentonite per part of halloysite by weight to increase the yield of said drilling mud, and a water soluble sodium carboxymethylcellulose in an amount sufficient to reduce the water loss due to filtration through said filter cake but insufficient to increase the viscosity of said drilling mud to such an extent that it cannot be circulated.

7. A water base well drilling mud comprising in combination sufficient water to maintain the mud as a fluid, sufficient halloysite to form a filter cake on the wall of the well, from 0.05 to 0.2 part of bentonite per part of halloysite by weight to increase the yield of said drilling mud, and a water soluble salt of a substituted cellulose selected from the group consisting of sodium, potassium, lithium and ammonium carboxymethylcelluloses and sodium, potassium, lithium, ammonium, calcium, magnesium, barium and strontium cellulose sulfates, cellulose alkysulfonates, and carboxyethylcelluloses, and sodium, potassium, lithium, ammonium, calcium, magnesium and strontium oxycelluloses, said oxycelluloses being reaction products of nitrogen dioxide and cellulose, in an amount sufficient to reduce the water loss due to filtration through said filter cake without increasing the viscosity of said well drilling mud to such an extent that it cannot be circulated.

8. A water base well drilling mud comprising in combination sufficient water to maintain the mud as a fluid, sufficient halloysite to form a filter cake on the wall of the well, from 0.05 to 0.2 part of bentonite per part of halloysite by weight to increase the yield of said drilling mud, and a water soluble sodium carboxymethylcellulose in an amount sufficient to reduce the water loss due to filtration through said filter cake without increasing the viscosity of said well drilling mud to such an extent that it cannot be circulated.

9. In a process of drilling wells comprising the steps of drilling the well with well drilling tools, and circulating through the well during said drilling a water base drilling mud, the improvement comprising incorporating in said drilling mud a sufficient amount of halloysite to form a filter cake and a water soluble alkali metal carboxymethylcellulose in an amount sufficient to reduce the water loss due to filtration through said filter cake but insufficient to increase the viscosity of said drilling mud to such an extent that it cannot be circulated.

10. A water base well drilling mud comprising in combination sufficient water to maintain the mud as a fluid, sufficient halloysite to form a filter cake on the wall of the well, and a water soluble alkali metal carboxymethylcellulose in an amount sufficient to reduce the water loss due to filtration through said filter cake without increasing the viscosity of said well drilling mud to such an extent that it cannot be circulated.

11. In a process of drilling wells comprising the steps of drilling the well with well drilling tools, and circulating through the well during said drilling a water base drilling mud, the improvement comprising incorporating in said drilling mud a sufficient amount of halloysite to form a filter cake, from 0.05 to 0.2 part of bentonite per part of halloysite by weight to increase the yield of said drilling mud, and a water soluble alkali metal carboxymethylcellulose in an amount sufficient to reduce the water loss due to filtration through said filter cake but insufficient to increase the viscosity of said drilling mud to such an extent that it cannot be circulated.

12. A water base well drilling mud comprising in combination sufficient water to maintain the mud as a fluid, sufficient halloysite to form a filter cake on the wall of the well, from 0.05 to 0.2 part of bentonite per part of halloysite by weight to increase the yield of said drilling mud, and a water soluble alkali metal carboxymethylcellulose in an amount sufficient to reduce the water loss due to filtration through said filter cake without increasing the viscosity of said well drilling mud to such an extent that it cannot be circulated.

HENRY ARTHUR CARLSON.

REFERENCES CITED

The following references are of record in the file of this patent:

UNITED STATES PATENTS

| Number | Name | Date |
|---|---|---|
| 2,073,413 | Cross et al. | Mar. 9, 1937 |
| 2,129,913 | Cross et al. | Sept. 13, 1938 |
| 2,425,768 | Wagner | Aug. 19, 1947 |